United States Patent [19]
Schramer

[11] Patent Number: 5,924,387
[45] Date of Patent: Jul. 20, 1999

[54] INTERACTIVE PET TOY

[76] Inventor: D. Gregory Schramer, 615 Kingsbridge Dr., Carol Stream, Ill. 60188

[21] Appl. No.: 08/555,119

[22] Filed: Nov. 8, 1995

[51] Int. Cl.[6] ..................................................... A01K 29/00
[52] U.S. Cl. .............................................................. 119/708
[58] Field of Search ..................................... 119/702, 707, 119/708, 709, 710, 711, 786, 787, 788, 791

[56] References Cited

U.S. PATENT DOCUMENTS

| | | | |
|---|---|---|---|
| 3,097,626 | 7/1963 | Felten | 119/708 |
| 4,771,732 | 9/1988 | Carney | 119/29 |
| 4,930,448 | 6/1990 | Robinson | 119/708 |
| 4,940,018 | 7/1990 | Edling | 119/29 |
| 5,148,769 | 9/1992 | Zelinger | 119/708 |
| 5,575,241 | 11/1996 | Line | 119/708 |

FOREIGN PATENT DOCUMENTS

| | | | |
|---|---|---|---|
| 465221 | 5/1950 | Canada | 119/791 |
| 3908241 | 11/1990 | Germany | A01K 1/035 |
| 229114 | 2/1925 | United Kingdom | 119/788 |

*Primary Examiner*—John G. Weiss
*Assistant Examiner*—John M. Black
*Attorney, Agent, or Firm*—McCaleb, Lucas & Brugman

[57] ABSTRACT

A toy device for pet animals, particularly cat's and like natural hunters, comprising a ground engaging base pedestal, a pair of rigid linear posts, adapted to be coaxially assembled with a single relatively stiff coil spring to form a flexible mast anchored at one end to the pedestal; an elongated highly flexible linear wire spring carrying a pet attractive bait or fascinator at one end and a connector at its opposite end, for connecting the wire spring to the non-anchored end of the mast, the connector rotatably supporting the linear spring for 360° rotation. A modified coil spring is fitted with a noise maker operably reactive to flexure of the coil spring.

10 Claims, 2 Drawing Sheets

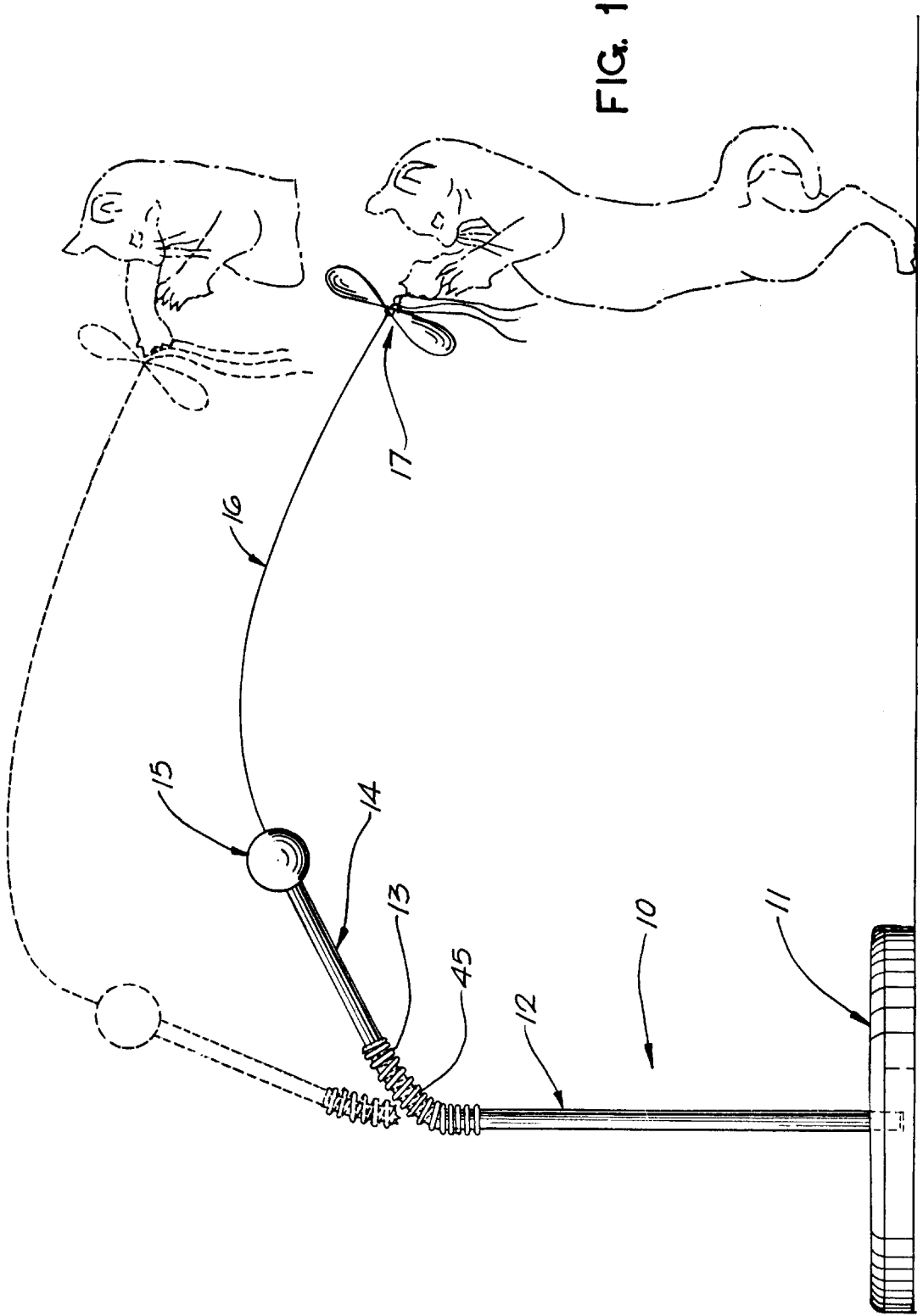

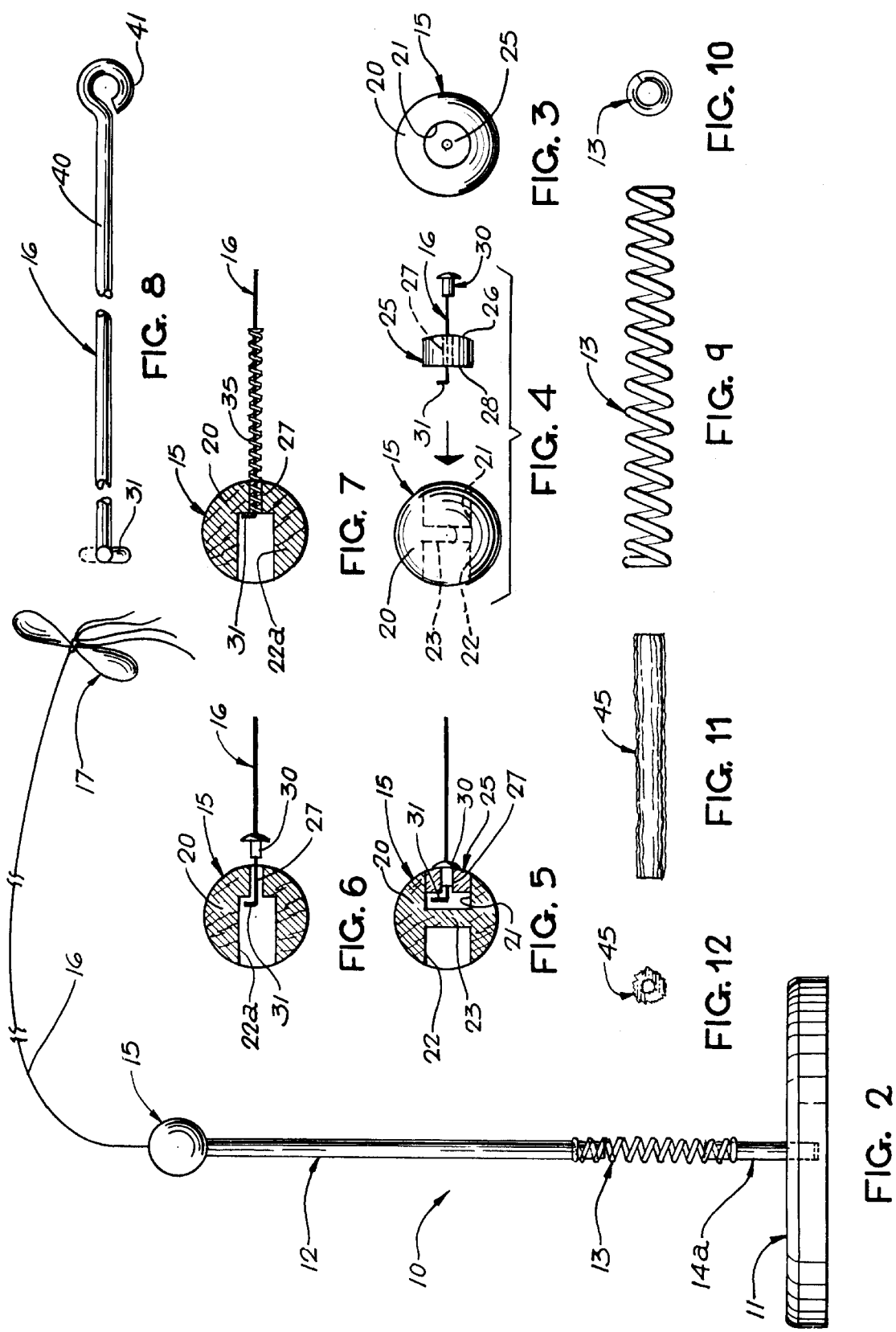

5,924,387

INTERACTIVE PET TOY

This invention relates generally to pet amusement and exercise equipment and more particularly to a toy device employing a randomly mobile bait or fascinator capable of attracting and generating interaction with a cat or other pet animal.

BACKGROUND OF THE INVENTION

It is well recognized that certain animals, such as cats, are prone to play with all manner of toys and play equipment, particularly if such equipment emulates natural prey of the animal, thereby arousing the hunter instinct which is especially prevalent in cats, for example.

Inasmuch as cats, by way of an illustration, are born hunters it is axiomatic that an animated bait readily captures a cat's attention and provides an interactive play and exercise experience for the animal. The degree to which a particular play occupation may endure for the animal, depends largely on the nature of the activity involved and the degree of interest generated in the animal.

One simple cat toy utilizes a single linear spring wire having a cat attractive bait fastened to one end thereof while the opposite end is hand held by a person and manipulated in a manner to tempt the cat to play with the toy bait. A device of this general nature is the subject matter of a U.S. Pat. No. D295,798, issued May 17, 1988. While such hand held toys of that or similar nature are known and have proven fairly successful in attracting and fascinating pets, the degree of animation of the bait is limited by the capability of the human operator to manipulate the single wire spring in a myriad of gyrations capable of maintaining the pet's interest. Also, the availability of the toy to the pet depends upon the presence and disposition of a persons hand to play with the pet.

Recognizing the aforenoted limitation of hand-held toys, the device of this invention, while employing a bait supporting linear wire spring as one component, utilizes an overall dual spring system that provides greatly increased movement activity with a greater scope of random action and animation than in heretofore known pet toys. It may be animated from rest by the pet swatting the bait which action stresses the wire spring which, in turn, actuates the coil spring so that the composite system springs into action. The wire spring, when stressed by bending, activates the coil which in turn, when stressed by bending, activates the wire spring. Thus, the elements of pseudo perpetual motion are present.

BRIEF SUMMARY OF THE INVENTION

In brief, the present invention comprises an interactive pet toy especially adaptable for use by pet animals having a natural hunter's instinct, which comprises a stationary base pedestal, a pair of rigid linear supports, coaxially interjoined by a single relatively stiff coil spring to form a flexible mast having a moveable outer end with its other end firmly anchored in the pedestal; an elongated single linear wire spring carrying a pet fascinator or bait of an appreciable weight at a freely moveable end thereof and having its opposite end joined to the non-anchored end of the mast by means of a connector device that preferably rotatably supports the anchored end of the linear wire spring, so that it and the fascinator are freely rotatable in either direction about the connector and mast axis while randomly oscillating both vertically and horizontally thereabout.

It is a principal object of this invention to provide a pet toy specially adapted for cats, ferrets or like hunting animals.

Another important object of this invention is to provide an improved animated pet toy as aforesaid, which comprises a system of wire springs connected in series; one stiffer coil spring being anchored at one end to a stationary support while the other end thereof carries a moveable support to which an elongated bait carrying highly flexible wire spring is attached. The two springs are arranged to react to one another in random, periodic fashion.

Still another object of this invention is to provide an interactive pet attractive toy comprising a unique series aligned multiple spring and stationary support system as aforesaid in which the stationary support and springs may be interrelated in selected relationships to alter the response period amplitude and frequency of a bait fascinator attached to the outer free end of the system.

Having described this invention, the above and further objects, features and advantages will appear from time to time from the following detailed description of a preferred embodiment thereof illustrated in the accompanying drawings and representing the best mode presently contemplated for enabling those skilled in the art to practice this invention.

IN THE DRAWINGS

FIG. 1 is a partially foreshortened side elevational view of a pet toy in accordance with this invention illustrating a first arrangement of parts;

FIG. 2 is a partially foreshortened elevational view similar to FIG. 1, but showing an alternate arrangement of parts for the toy of this invention;

FIG. 3 is a top plan view of a ball connector employed in the toy assemblies of FIGS. 1 and 2;

FIG. 4 is a partial exploded elevational view of the ball connector of FIG. 3 illustrative of the mode of assembly of parts thereof;

FIG. 5 is a full cross sectional view of the assembled connector shown in FIG. 4;

FIG. 6 is a cross sectional view, similar to FIG. 5, illustrating a modified mode of connecting the wire spring to the ball connector;

FIG. 7 is another cross sectional view similar to FIG. 6 and showing a second alternative means of mounting the wire spring in the ball connector;

FIG. 8 is an enlarged foreshortened elevational view of a preferred wire spring employed in the toy assembly of FIGS. 1 and 2 according to this invention;

FIG. 9 is a side elevational view of the coil spring shown in the assemblies of FIGS. 1 and 2;

FIG. 10 is an end elevational view thereof;

FIG. 11 is a side elevational view of a noise maker insert for the spring of FIG. 10; and FIG. 12 is an end elevational view of the insert shown in FIG. 11.

DESCRIPTION OF PREFERRED EMBODIMENT

Turning now to the features of the preferred embodiment of this invention, initial reference is made to FIGS. 1 and 2 where the assembled toy indicated generally at 10 is illustrated. As shown in FIG. 1, the toy hereof comprises a base 11, which has a central socket 11a closely receptive of a stationary, rigid cylindrical post 12 which extends centrally upwardly from base 11. Fitted closely over the upper end of a support post 12 is one end of a relatively stiff coil spring 13 which also has its opposite end snugly fitted over the lower end of a second support post 14 thereby providing a unified mast having a flexible spring joint between the two posts 12 and 14. A connector 15 is fitted snugly over the outer end of the post 14 and serves to rotatably support one end of a linear wire spring 16 having a pet attractive toy or fascinator bait 17 attached to the outer free end thereof.

In FIG. 2 of the drawings, the aforedescribed elements of the toy assembly 10 are illustrated in a reorganized relationship wherein the long post 12 supports the ball connector 15 at its outer end while post 14 of FIG. 1, is connected to the now lower end of the coil spring 13 and fitted snugly into support platform socket 11*a*. This modified arrangement serves to change the oscillation frequency and amplitude of spring 13 and thus the outer end of the mast assembly, thereby producing variation in the responsive movements of the single wire spring 16 and toy fascinator 17 attached thereto. More specifically, movement frequency of the outer end of the mast in accordance with the FIG. 1 assembly is faster and at a shorter arc and oscillation period than the alternate assembly shown in FIG. 2 whereat the longer more massive post 12 is at the upper end of the mast. It is to be noted that the serial relationship between the longer and shorter post, as selected, and the coil and linear wire springs provides a system which is selectively and easily adjusted to fast or slower movements of the toy fascinator 17 as desired.

It will be noted also that whereas coil spring 13 provides lateral oscillating movements to spring 16 and the uppermost post of the mast assembly in accordance with the FIGS. 1 or 2, such permitted movement thereof is primarily radial of base 11 and the stationary post of the mast assembly.

The single linear wire spring 16 in contrast to the coil spring 13, rotates about its anchored or tethered end adjoined to the ball connector 15 and in a random vertical and radial pattern thereabout in reaction to flexing movements of spring 13. It is to be noted that the two springs are interreactive. Thus radial movement of spring 13 activates light spring 16 to cast the latter and its bait 17 much as a fisherman casts with a fly rod. The weight of bait 17 in turn causes spring 16 to react to the movement of spring 13 and exert a pulling force on spring 13, thereby reactivating the latter. Thus, the spring interaction is repeated. As a result, the movement patterns of the toy fascinator 17 are random and erratic in accordance with the movement forces applied sequentially to both springs 16 and 13 by the pet animal playing with the fascinator 17, during which play the fascinator is occasionally caught or pulled on and then released by the animal causing an interreactive flexure of the serially aligned spring system of this toy as above noted. Unrestricted rotational movement of the toy 17 about the mast while gyrating randomly throughout a generally semispherical pattern in accordance with the flexuring movements from the single wire spring 16 takes place as well. The totality of the resultant unpredictable movements of the toy fascinator makes for an interesting and attractive toy for a pet animal, such as a cat, when playing with the fascinator 17 since the random, unexpected movements of the fascinator emulate that of a cornered bird or other prey.

Turning now to the specifics of the aforenoted elementary parts of assembly 10, base 11 comprises a wooden disc of approximate 1 inch thickness and 8–10 inch diameter with a circular or other desired plan profile and a central blind bore socket 11*a* extending inwardly of the upper face thereof. Socket 11*a*, for example, may be ⅜ inch in diameter and a depth of approximately of ⅝" to snugly receive a ⅜ inch diameter post of the mast. It is not necessary, of course, that this base be made of wood, since cast metal, plastics or other materials easily may be adapted for this purpose, to comprise a stabilizing pedestal for the toy assembly 10.

In the herein illustrated embodiment posts 12 and 14, preferably constitute lengths of rigid wood or plastic dowel material of known cylindrical configuration; the longer post member 12 being approximately 12 inches long and the shorter post 14 being approximately 6 inches in length, having a diameter of ⅜ of an inch to fit the central opening or socket 11*a* formed in base 11.

Coil spring 13 as best illustrated in FIGS. 9 and 10 of the drawings, preferably is approximately 3–5 inches long with approximately 20 coils having an outside diameter of generally 0.525 inches and an inside diameter of approximately 0.369 inches for reception of the ends of the dowel post members 12 and 14. Typically, spring 13 is best constructed of relatively heavy (0.075 inch diameter) coiled music wire suitably zinc plated and coated to prevent rusting.

Turning now to the features of the ball connector 15, initial reference is made to FIGS. 3–5 of the drawings wherein a preferred form of ball connector is illustrated. As is there shown, connector 15 comprises a generally spherical, preferably wooden or plastic ball approximately ⅞ inch in diameter, having a pair of coaxially aligned blind bore openings 21 and 22 extending axially inwardly of opposite polar ends of the spherical body 20 thereof to provide a pair of coaxially aligned cylindrical sockets separated by an intervening wall portion 23 (see FIG. 5). The socket bores 21 and 22 match the diameter of the posts 12 and 14 with one of the sockets, 22 for example, being receptive of the outer end of one of the post sections 12 or 14 in the mast assembly as indicated in FIGS. 1 and 2. The second socket 21 is receptive of a wooden plug 25 having a semi-rounded outer face 26 and a bored opening 27 extending therethrough from outer face 26 to a planar bottom face 28 thereof (see FIG. 4). The diameter of the bore 27 may be in the order of 3/32 inches for receiving the wire spring 16 therethrough. Preferably a tubular brass ferrule 30, as shown in FIGS. 5 and 6, is mounted in bore 27 to provide a bearing surface for rotation of the wire spring 16 in bore 27.

It will be noted that one end of the spring 16 is turned over at right angles as indicated at 31 for the purpose of retaining the wire spring in bore 27. As best indicated in FIG. 5 of the drawings, when the plug 25 is inserted into socket 21, after the wire spring 16 and ferrule 30 are assembled therewith, the wire 16 is captured in the socket 21 in a manner which permits it to freely rotate within the bored opening 27 even when the connector 15 is removed from the mast.

In FIG. 6 a modified ball construction is indicated, wherein a post receptive bore 22*a* is extended axially into body 20 of the ball connector 15*a* to eliminate wall 23, shown in the preferred connector of FIGS. 4 and 5. The wire spring 16 extends through bored opening 27 coaxially of socket 22*a* and preferably is fitted with a crimped metal sleeve 33 to provide an axial stop in conjunction with the turned over end portion 31 to prevent axial withdrawal of spring 16 from bore 27. In this version the plug 25 of the FIG. 5 assembly is eliminated.

In FIG. 7 another mode of interconnecting the wire spring 16 to the connector is illustrated whereat the structure of ball 15*a* includes the axially extended socket 22*a* communicating with the small bored opening 27 for the passage of the wire spring 16, as in the FIG. 6 structure. The structure of FIG. 7 differs from the assembly of FIG. 6 in that the metal sleeve 33 is replaced with a small diameter spring 35 which serves to generally stiffen and maintain the end of the spring wire 16 coaxially within the bore 27 during its rotational gyrations.

Turning now to the features of the single wire spring 16, it will be recognized from FIG. 8 in particular, that the same comprises an elongated body 40, having its one end 31 formed in a loop and turned or bent at right angles to the axis of body 40. In practice the wire spring may be in the order of 3 feet in length and formed of music wire having a 0.036 inch diameter with satisfactory results. The body 40 of the spring 16 is of course inserted through opening 27 in the ball connector 15 as indicated in the drawing FIGS. 5–7. The base end 31 of the spring wire 16 may be formed either before or after the wire body 40 is assembled with the plug 25 or connector body 20. Thereafter the outer or other free end of the wire spring 16 is suitably looped in a circular pattern, as indicated at 41, to provide an anchor for attaching the fascinator bait 17 thereto.

In FIGS. 1 and 2 it will be noted that although the fascinator bait 17 is illustrated as a fanciful fly, balls, bars, mice or bags of cat nip or other configurations of the fascinator bait may be employed, as well. In this respect, it will be recognized and appreciated that due to the detachable relation of the ball connector 15 with the mast of the toy, the sub-assembled ball, wire spring and fascinator may be readily replaced with additional or other fascinator toys preassembled with the wire 16.

As an added attraction or attention getter for the pet animal confronted with the toy assembly 10 of this invention, and in recognition of the fact that most animals (cats in particular) are fascinated by noises, it has been discovered that a simplified noise maker 45 may be incorporated in the toy assembly hereof. In brief, cellophane, plastic or other thin sheet material is rolled up into a tubular scroll body 46 readily insertible into the open core or alternatively mounted over the exterior of the spring 13 as generally indicated in FIGS. 11 and 12 of the drawings. Once such a scroll member is inserted within or about the central portion of the coil spring 13 so as to contact the coils thereof, flexing of the spring serves to exercise the sheet material in such a manner as to emit scraping noises that the pet animal, such as a cat, finds fascinating and interest provoking.

From the foregoing it is believed that those familiar with the art will readily recognize and appreciate the advancement of the present invention over the prior art and will understand that while the same has been herein described in association with a preferred and modified embodiments thereof the same is susceptible to variations, changes, modifications and substitutions of equivalents without departing from the spirit and teachings of the invention which are intended to be unlimited by the foregoing except as may appear in the following appended claims.

The embodiments of the invention in which an exclusive property or privilege is claimed are defined as follows:

1. A toy amusement device for pet animals, comprising;
   a pair of coaxially related linear posts,
   a coil spring coaxially interjoining opposing ends of said posts to form a substantially linear mast having an intermediate flexible joint;
   a ground engaging base forming a pedestal having means for securely mounting said mast in substantially upright operating position,
   connector means mounted on an outer free end of said mast;
   a single linear strand, elongated wire spring having one end thereof rotatably tethered to said connector means and a second end freely moveable relative to said connector means; said wire spring statically tending in an arc upwardly and outwardly from said mast; and
   a pet attractive fascinator secured to said second end of said wire spring for random free movements in reactive response to interactive flexures of said coil and wire springs.

2. The amusement device of claim 1, wherein said posts are rigid members.

3. The amusement device of claim 1, wherein said opposing ends of said posts are axially separated when interjoined by said coil spring.

4. The amusement device of claim 1, wherein said means for mounting said mast comprises a socket formed in said base the insertion of a bottom end of said mast therein.

5. The amusement device of claim 4, wherein one of said posts is long and the other post is short and said mast is aligned with said short post mounted in said socket whereby said coil spring is located adjacent said bottom end of said mast.

6. The amusement device of claim 4, wherein said mast is aligned with said long post mounted in said socket whereby said coil spring is adjacent said outer free end of said mast.

7. The amusement device of claim 1, wherein said connector means comprises a spherical ball formed with an axial socket receptive of said outer free end of said mast.

8. The amusement device of claim 7, wherein said connector means is formed with a pair of coaxially aligned sockets, one of which is receptive of a plug having an axial opening therethrough for free passage of said wire spring; said one end of said wire spring being aligned transversely of said axial opening to prevent withdrawal of said spring therefrom; said wire spring being rotatable within said opening.

9. The amusement device of claim 8, and a metal ferrule mounted in said axial opening to promote rotation of said wire spring therein.

10. The amusement device of claim 1, and a noise maker operatively responsive to flexing movements of said coil spring comprising a scroll of thin sheet material arranged to engage the coils of said coil spring so as to audibly respond to flexure of said coils.

\* \* \* \* \*